Patented Jan. 6, 1948

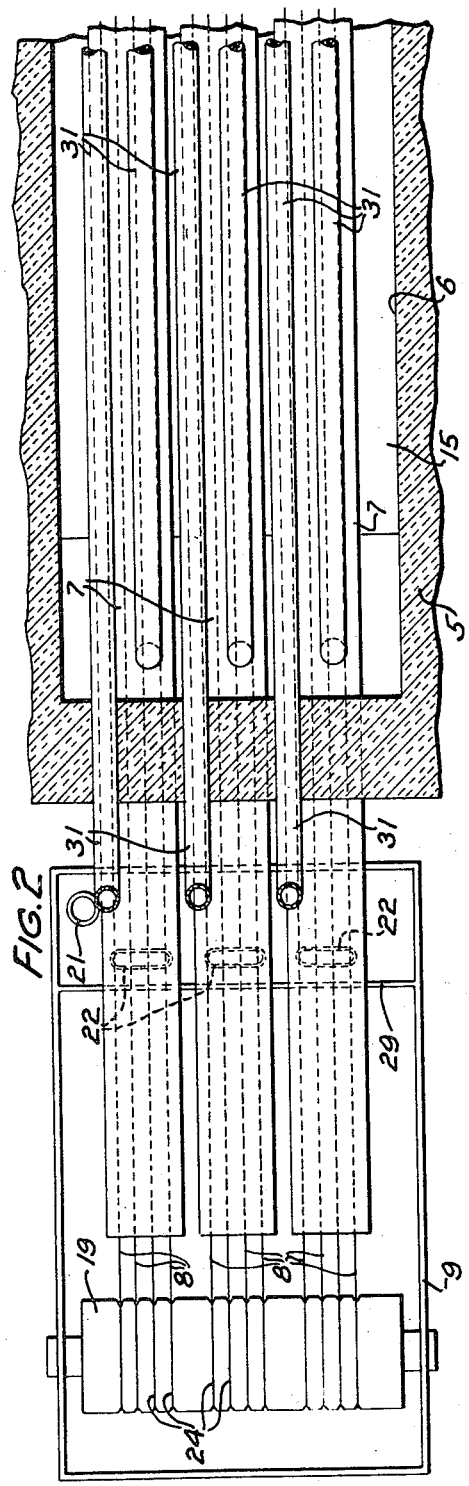

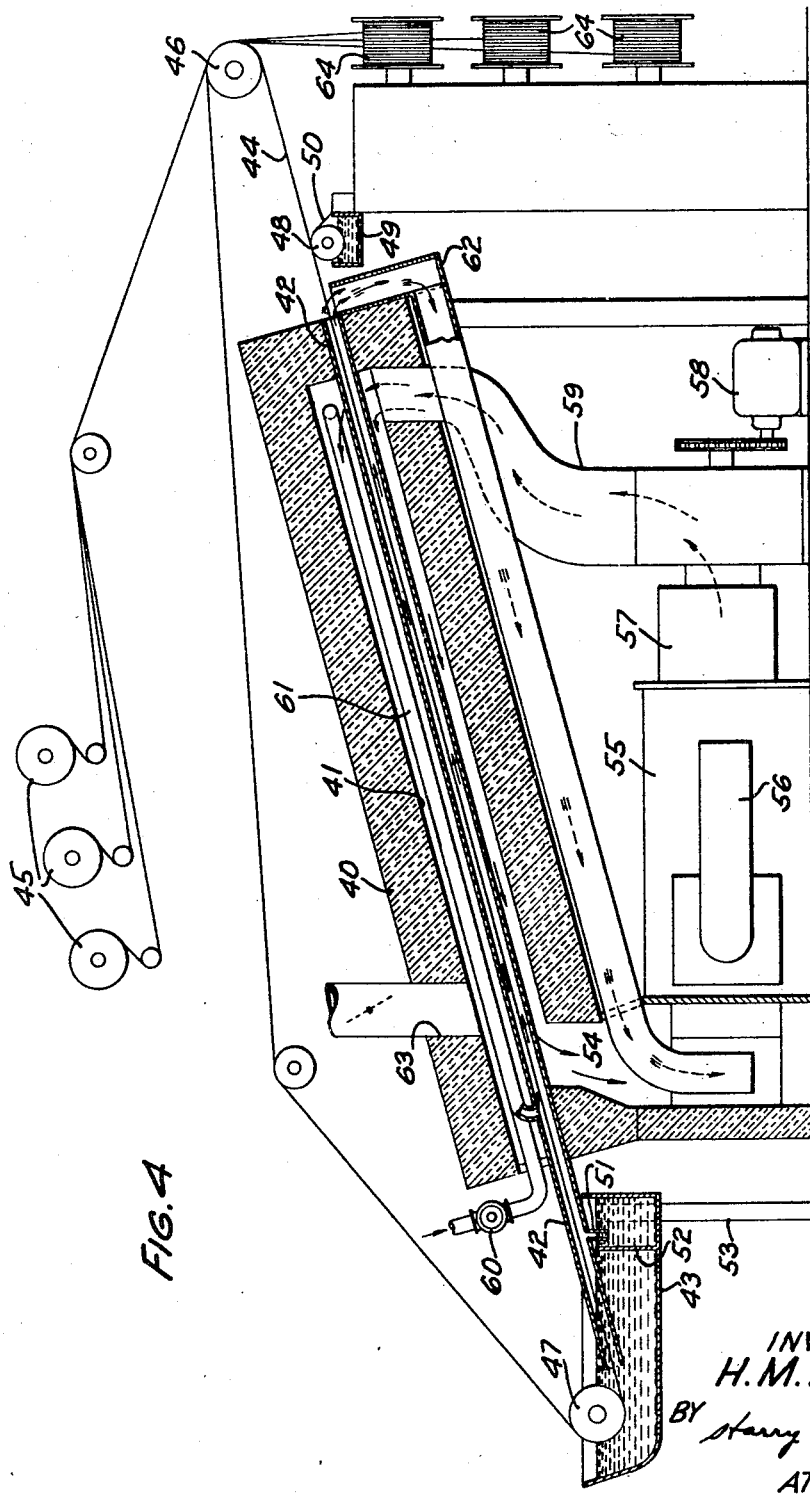

2,434,169

UNITED STATES PATENT OFFICE 2,434,169

DRIER FOR COATED WIRES

Henry M. Larsen, La Grange, Ill., assignor to Western Electric Company, Incorporated, New York, N. Y., a corporation of New York Application January 7, 1944, Serial No. 517,351

11 Claims. (Cl. 34—86)

This invention relates to drier for coated wires and more particularly to an apparatus for applying and baking one or more coatings of insulating varnish or enamel upon copper wires or the like.

Wire enameling machines have heretofore been devised for baking one or more coatings of insulating enamel or copper wires by passing the enamel coated wires through a tubular baking oven. In order to insure continuously uniform baking of the enamel coatings on the wire, considerable care must be taken to secure and maintain a uniform temperature throughout all portions of the baking oven.

An object of the present invention is to provide an efficient and effective strand coating apparatus for expeditiously applying one or more adherent coatings on a strand.

In accordance with one embodiment of this invention, a wire enameling apparatus may be provided in which the baking oven comprises a series of inclined tubes, one for each wire, which are heated externally by circulating hot air at extremely high speed around and along the outsides of the tubes, thus insuring a substantially uniform temperature throughout the baking portions of the several oven tubes so that uniform baking of the enamel coatings is secured. The enamel is applied to the wires by roller applicators which are positioned near the upper ends of the inclined oven tubes, and the freshly coated wires enter the upper ends of the tubes and travel downwardly therethrough. The lower ends of the tubes are submerged in water to provide a seal against ingress of outside air. However, a controlled amount of pre-heated fresh air is admitted into the lower end of each tube for oxidation of the enamel and is passed upwardly counter to the direction of travel of the wire, thereby insuring that the enameled wire passes through a zone of fresh air during the major portion of the baking period, a condition desirable for best baking of the oxidizing enamel.

A more complete understanding of the invention may be had from the following detailed description taken in conjunction with the accompanying drawings, in which Fig. 1 is a diagrammatic side elevational view, partly in section, of a wire enameling machine embodying the features of the invention;

Fig. 2 is an enlarged diagrammatic horizontal section on line 2—2 of Fig. 1;

Fig. 3 is an enlarged diagrammatic horizontal section on line 3—3 of Fig. 1, and Fig. 4 is a diagrammatic side elevational view similar to Fig. 1, but showing an alternative type of heating system for the enamel baking oven.

Figure 1:
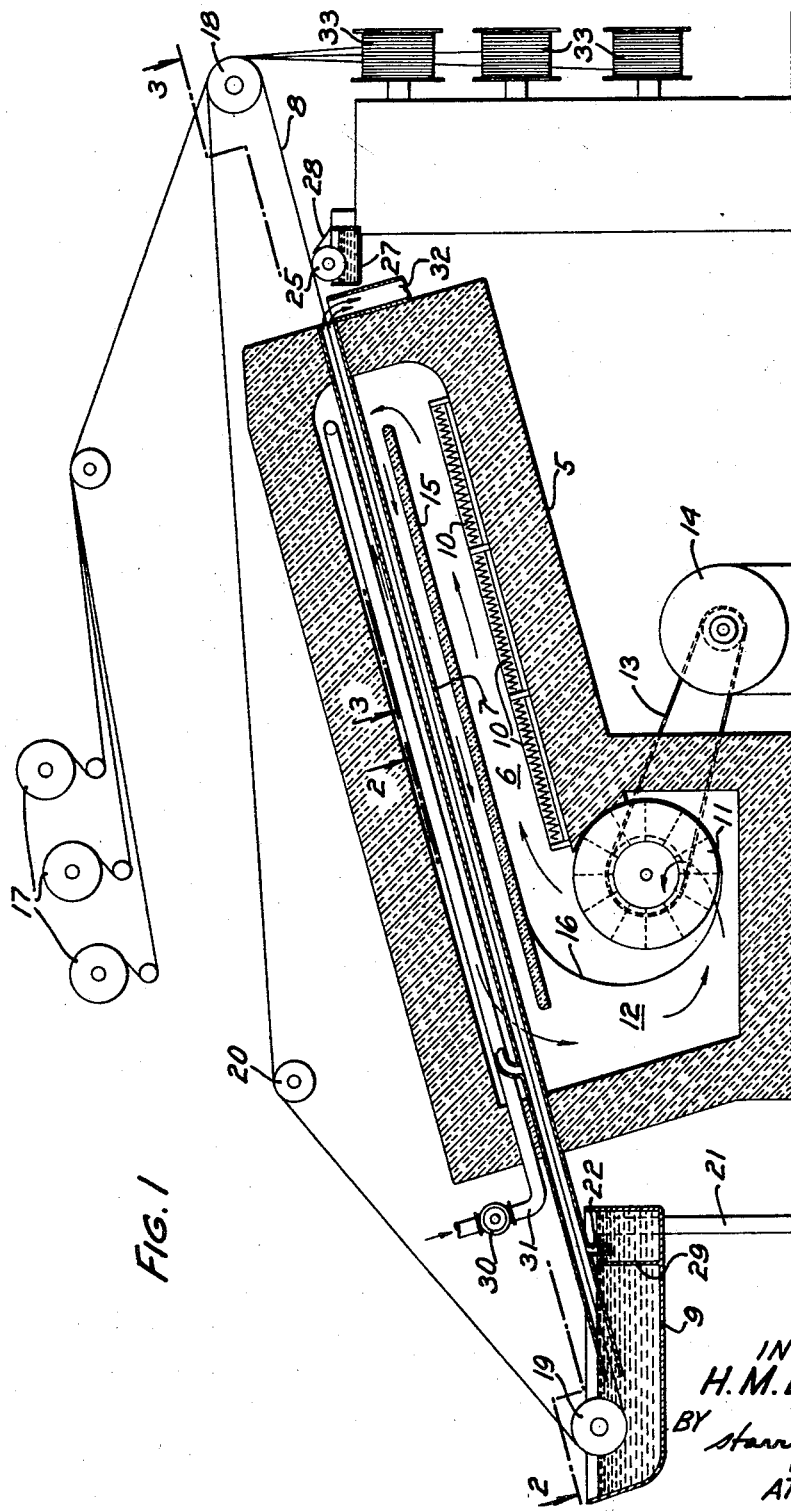

Referring now to the drawings and particularly to Fig. 1, a wire enameling oven 5 is there illustrated having an inclined elongated chamber 6 formed therein. Insulating material is used in the construction of the oven and the walls of the oven are made relatively thick to keep the heat loss at a minimum. A number of tubes 7, through which strands of wires which have been previously coated with enamel and are now to be baked may be passed, extend through the ends of the oven 5 and lengthwise through the chamber 6. The tubes are inclined at an angle similar to that of the chamber 6, as may be seen in Fig. 1, and the lower ends of the tubes extend into a tank 9. By using inclined tubes instead of vertical, the necessary height of the apparatus is substantially reduced thus making it more readily accessible than vertical type machines, while permitting the use of a liquid air seal at the lower ends of the tubes.

The tank 9 is normally filled with water to a level sufficient to cover the ends of the tubes and thus to provide an air seal. Water has the advantage over felt and similar materials previously used to form a seal in enameling machines in that it provides a positive and reliable seal while at the same time permitting wide flexibility in the stringing of the wire or in permitting splices of the wire to pass through since a relatively large size tube may be used and the opening at the end need not be restricted as by a felt seal. Normally, water will not wet the clean enameled wire, so the water in the tank has no effect other than to seal the tubes from air. Water is supplied continuously to the tank 9 and the upper end of an overflow pipe 21 is positioned in the tank 9 to maintain the desired level of water in the tank.

The oven is heated by a number of electrical heating elements 10 which are mounted, as shown in Fig. 1, on the lower side of the interior of the heating chamber 6. In order to obtain substantially uniform temperature throughout the treating chamber, the air in the chamber 6 is circulated through the chamber at very high speed by a fan 11 which is mounted inside a lower portion 12 of the oven 5 connected directly to the heating chamber. The fan may be driven by a belt 13 which connects it to a suitable motor 14. A baffle plate 15 extends longitudinally across the oven chamber 6, being mounted in the side walls of the oven so as to cause the air which is circulated by the fan to first travel across the heating elements 10 and then to pass downward along the tubes. An arcuate plate 16 which forms a part of the fan housing is positioned between the lower end portion of the baffle 15 and the fan 11 and divides the chamber 12 so as to cause the air leaving the fan to move first along the underside of the baffle 15 and then downward along the tubes 7. Thus the upper portion of chamber 6, in cooperation with the baffle 15, comprises an opening in the channel, to the upper end of which the blower or fan 11 supplies heated air and from the lower end of which the fan draws air into its inlet.

The fan 11 is operated at a speed sufficient to cause the air to be circulated completely through the oven and treating chamber at a rate on the order of five complete circuits per second with no fresh air being admitted to the oven. This rapid movement of the heated air insures that the temperature in all parts of the oven is the same. In an apparatus which was constructed in accordance with this invention in which a chamber approximately six feet in length was employed, a heat curve was obtained in the baking tubes which rose to a full value of temperature approximately six inches from the entrance and remained flat almost the entire length of the tubes and finally dropped off about six inches from the lower end of the chamber. It will be understood that this shape of heat curve gives substantially the maximum efficiency in use of the oven length for a given energy input.

Furthermore, since the heating elements 10 are quickly relieved of their energy, hot spots in the elements are avoided and in this way burning out of the elements is likewise prevented. This permits the oven to be operated at the maximum temperature the enameling process can tolerate, thus permitting a reduction in the length of time required for the baking treatment. Also, while the temperature at which the oven is maintained is on the order of 800° F., because of the uniform distribution of heat throughout the oven, high temperature resistant metal is not required for the oven parts. Because of the high degree of uniformity in the temperature of the heating chamber as a result of the extremely rapid circulation of air therethrough, the temperature indicated by a single thermocouple, or similar device, located in the air stream closely represents the temperature of the entire heating chamber. This greatly simplifies the practical operation of the apparatus by reducing the number of controls and indicators ordinarily required. When it is desired to increase the temperature, it is merely necessary to increase the current applied to the elements 10 or conversely when it is desired to lower the temperature, the current applied is reduced.

In the operation of this apparatus, the strands of wire 8, which may be supplied from supply spools 17 mounted adjacent the oven, are passed over an elongated sheave 18 and then downward and through the tubes 7. The lower portion of a second sheave 19 is positioned within the tank 9 and so disposed that the wires, which are held taut as they pass through the tubes, will not touch the sides of the tubes. The sheaves are driven so as to apply a slight predetermined tension on all wires. After leaving the sheave 19, the wires pass over a free roller 20 and then return to the sheave 18.

In the embodiment of the invention shown in the drawings, three strands of wire are treated simultaneously and are each passed four times through the parallel tubes 7 which are somewhat greater in width than height. As shown in Fig. 3, three tubes are employed. Also, as shown in Fig. 3, the sheave 18 is provided with a plurality of peripheral grooves 23 which are parallel and spaced slightly apart. After passing once through the oven without enamel being applied to the wire so as to remove the volatile impurities in the wire, a strand of wire may then be strung over an adjacent groove on the sheave 18 and passed through the same tube and then over a second groove of a set of grooves 24 formed in the sheave 19 and adjacent the groove over which the wire originally passed. Any number of passes may be made as required by providing the requisite number of grooves. It will be understood, of course, that this apparatus is designed to operate continuously and that having once strung a strand over the sheaves 18 and 19 to provide the required number of passes, as a supply spool is emptied, an additional supply of wire is spliced to the wire on the original supply spool substantially without interruption of the operation of the apparatus.

Prior to entering the upper ends of the tubes, the wires are passed over a coating roller 25 by which enamel is applied to the wire. The roller 25, which is provided with a number of peripheral grooves 26 corresponding in position to the grooves 23 in the sheave 18, is positioned in a tank 27 containing a suitable amount of enamel. The wires pass through the grooves 26 and an amount of enamel is applied to the wire substantially proportional to the speed of rotation of the roller and the size of the grooves. The height of the level of the enamel in the tank 27 does not affect the action of the roller applicator and it is only necessary that the roller be wet with enamel to function. Enamel is left only in the grooves 26, the excess being removed from the roller by a doctor blade 28 which is mounted on the upper side of the tank 27 and bears against the surface of the roller 25. To increase the thickness of enamel applied to the wires, the speed of rotation of the roller is increased. Normally, however, the roller rotates at a lower peripheral speed than the rate of advance of the wires. While the roller applies enamel only to the lower portion of the wires, as the wires move into the heated part of the oven, the enamel is immediately evenly distributed about the wire and the finished enamel coating is concentric with the wire. Where the first pass is to be made without enameling the wire, the wire may be lifted above the roller 25 by interposing a suitable idler.

Since the lower ends of the tubes 7 are positioned beneath the water in the tank 9, no air is admitted to the tubes. However, a certain amount of fresh air is required for oxidation of the enamel during the baking operation, and to remove the enamel solvent which is, of course, volatilized during the baking operation. In the present apparatus, fresh heated air is supplied to the wires under slight pressure, normally on the order of two pounds per square inch, through valves 30 and inlet pipes 31 which are associated with each tube 7 and enter the chamber 6 at its lower end. The pipes 31 extend lengthwise along the chamber substantially to the upper end thereof and are then looped backward and connected to the tubes 7 at a point as near as practical to the lower end of the chamber 6. In this way the air supplied to the tubes 7 is preheated to the temperature of the oven before being brought into contact with the wires.

The upper end of a fume exhaust duct 32 is mounted adjacent the upper ends of the tubes 7 to remove the volatilized solvents and other gases evolved during the baking operation. However, some of the gases evolved during the baking operation condense on the sides of the tubes and the condensate normally flows downward toward the tank 9. In order to remove this condensate without affecting the coated wires, a drain pipe 22 is connected to the lower side of each of the tubes 7 and positioned just ahead of the point where the tubes enter the water. As the condensate drips through the drain pipe 22, it is confined in the right portion of the tank and is eventually removed through the overflow pipe 21, being prevented from mixing with the water in the left side of the tank through which the wires are passed by a vertically disposed plate 29 which is mounted in the tank 9 and extends substantially to the level of the liquid, thus dividing the tank. After the strands of wire have been passed through the oven the required number of passes, the strands may be wound on a number of driven take up reels 33 which may be mounted to the right of the apparatus, as shown in Fig. 1.

An alternative embodiment of the present invention is illustrated in Fig. 4. In this embodiment of the invention, instead of heating the air to be circulated through the oven electrically, a gas heating device is provided. In other respects, the apparatus is substantially similar to that shown in Figs. 1, 2 and 3. More particularly, this alternative embodiment comprises an inclined oven 40 having an inclined chamber 41 formed therein and a number of inclined tubes 42 extending the length of the chamber. The lower ends of these tubes, which extend beyond the lower end of the oven, are disposed within a tank 43 which is filled with water to provide an air seal for the tubes. A number of strands 44, which may be supplied from reels 45 positioned near the apparatus, are passed over a multi-grooved sheave 46, through the tubes 42 and over a sheave 47 which is positioned within the tank 44. The sheaves 46 and 47 are operated similarly to the sheaves 18 and 19 to keep the strands taut, and any desired number of passes of wire may be obtained by providing the requisite number of grooves on the sheaves. Enamel is applied to the wire by a grooved coating roller 48, the lower portion of which rotates within a tank 49 mounted adjacent the upper ends of the oven 40 and a doctor blade 50 is associated with the roller 48 to remove the excess enamel. A drain pipe 51 is connected to the lower end of each tube 42 to permit the condensate of the solvent which collects in the tubes to drop into the right end of the tank 43, which is provided with a separating plate 52 and an overflow pipe 53 as in the first described embodiment of this invention.

The air in this embodiment of the invention is, as aforesaid, heated by the combustion of gases. A vertically disposed passage 54 is formed in the lower end of the oven 40 and connects at its upper end to the chamber 41 while at its lower end it is connected to a gas heating chamber 55 in which a burner 56 is positioned. Air is circulated through the chamber 41 down through the passage 54 and through the gas heating chamber 55 by a fan positioned in a fan chamber 57. A motor 58 is provided to drive the fan at a suitable speed as in the previously described embodiment of this invention. A large duct 59 connects the fan chamber 57 to the upper end of the heating chamber 41.

Fresh heated air is supplied to the tubes 42 under slight pressure through valves 60 and pipes 61, which extend from the lower end of chamber 41 to the upper end thereof and then are looped backward and connected to the tubes 42 similarly to the air supply pipes 31 described in connection with the first embodiment of this invention. The air is, of course, heated during its passage through the pipes 61 to substantially the same temperature as that of the interior of the heating chamber.

In wire enameling apparatus, a considerable problem has been the disposal of the volatile solvents and gases evolved from the enamel during the baking. These are often quite noxious and highly offensive. In the present apparatus, in addition to the gases normally supplied to the burner, the gases evolved during the baking of the enamel on the strands, which gases are highly combustible, are conducted through an exhaust duct 62, the upper end of which is positioned adjacent the upper ends of the tubes 42, to the passage 54. Suction is applied to the exhaust duct 62 by the fan used for circulating heated air in the oven and is sufficient to cause substantially all the gases from the tubes 42 to enter the duct. The gases are then mixed with the air being supplied to the combustion chamber 55 and are incinerated therein, thus eliminating the problem of the disposal of these waste gases. Some heat is, of course, provided by the combustion of these gases.

Fresh air, as may be needed for the combustion of gases in the gas chamber 55, is also supplied from the pipes 61 since the air which is supplied through the pipes 61 to the tubes 43 is eventually carried through the duct 62 to the combustion chamber 55. Air is also supplied to the burner 56 by being drawn from the room through exhaust duct 62, which, of course, is not directly connected to the pipes 61. Since the gas for the burner 56 as well as air from the duct 62 are introduced into the heating chamber 41 under pressure, an escape passage 63 is formed in the left portion of the upper side of the oven 40 to permit the air and gas to escape from the chamber. After the strands of wire have been passed through the oven, the required number of passes, the strands may be wound on a number of takeup reels 64 which may be mounted adjacent the apparatus, as shown in Fig. 4.

While but two embodiments of this invention have been shown and described, it will be understood that many changes and modifications may be made therein without departing from the scope of this invention.

What is claimed is:

1. A strand coating apparatus comprising an oven having a chamber formed therein, a tube extending at an angle to the horizontal through said chamber and having its interior sealed from direct communication with said chamber, means for supporting a quantity of liquid in contact with the lower end of said tube to seal the lower end of the tube from air, means positioned within said chamber for heating the air in said chamber, a blower for circulating air over said heating means and said tube to obtain a substantially uniform distribution of heat throughout the tube, means for passing a strand having a coating material to be heat treated thereon through said tube, and means for supplying heated fresh air to the interior of the tube to contact the strand moving therethrough, including means for moving said air in a direction counter to the direction of movement of said strand.

2. A strand coating apparatus comprising an oven having a chamber formed therein, a tube extending at an angle to the horizontal through said chamber and having its interior sealed from direct communication with said chamber, means for supporting a quantity of liquid in contact with the lower end of said tube to seal the lower end of said tube from air, means positioned within said chamber for heating the air in said chamber, a blower for circulating air over said heating means and said tube to obtain a substantially uniform distribution of heat throughout the heating chamber, means for passing a strand having a coating material to be heat treated thereon through said tube, means for supplying heated fresh air to the interior of the tube to contact the strand moving therethrough, including means for moving said air in a direction counter to the direction of movement of said strand, and means for removing said air at the upper end of said tube.

3. In a wire enameling apparatus, an oven having a chamber formed therein, a tube extending through said chamber at an angle to the horizontal and having its interior sealed from direct communication with said chamber, means for passing a strand through said tube, means for immersing one end of said tube in a quantity of liquid to form an air seal, means for heating the air in said chamber, a blower for circulating the air in said chamber to obtain a substantially uniform distribution of heat around the tube, and means for supplying heated fresh air to the interior of said tube adjacent the sealed end thereof to contact the strand moving therethrough.

4. A wire enameling apparatus comprising an oven having a chamber formed therein, a tube extending through said chamber at an angle to the horizontal and having its interior sealed throughout its length from communication with said chamber, means for supporting a quantity of liquid at the lower end of said tube to immerse the end of said tube in the liquid, means for passing a wire having a coating material to be heat treated thereon through said tube, means for supplying a quantity of heated fresh air to the lower end of said tube, means for removing said air from the upper end of said tube and for directing the air from the upper end of said tube and any gases derived from the heat treatment of the coating material in said tube to said chamber to supplement the gases fed to said chamber, and a blower for circulating the air through said chamber and about the exterior of said tube to obtain a substantially uniform distribution of heat throughout said tube.

5. In a wire enameling apparatus, an oven having a chamber formed therein, a tube extending through said chamber and having the interior sealed from direct communication with said chamber, means for passing a strand through said tube, means for immersing one end of said tube in a quantity of liquid to form an air seal, means for heating the air in said chamber, a blower for circulating and recirculating the air in said chamber at such a rate as to obtain a substantially uniform distribution of heat around said tube within the chamber, means for supplying heated fresh air to the interior of said tube adjacent the sealed end thereof, means for removing condensate from said tube, and means for preventing said condensate from coming into contact with said wire.

6. In a wire enameling apparatus, an oven having a chamber formed therein, a tube extending through said chamber and having its interior sealed from communication with said chamber, means for passing a strand through said tube, means for immersing one end of said tube in a quantity of liquid to form an air seal, means for heating the air in said chamber, a blower for circulating and recirculating the air in said chamber at such a rate as to obtain a substantially uniform distribution of heat around said tube within the chamber, means for supplying heated fresh air to the interior of said tube, said tube having an aperture formed in the lower end thereof to permit condensate to be removed from said tube, and means for preventing said removed condensate from coming into contact with said wire.

7. In a wire enameling apparatus, an oven having a chamber formed therein, an inclined tube extending through said chamber, means for passing a strand through said tube, means for immersing one end of said tube in a quantity of liquid to form an air seal, means for heating the air in said chamber, means for circulating the air in said chamber to obtain a substantially uniform distribution of heat within the chamber, a U-shaped pipe positioned within said chamber extending substantially the length thereof, and means for supplying fresh air to said pipe at one end, the other end of said pipe being connected to said tube.

8. In a wire enameling apparatus, an oven having a chamber formed therein, an inclined tube extending through said chamber, means for passing a strand through said tube, means for immersing an end of said tube in a quantity of liquid to form an air seal, means for heating the air in said chamber, means for circulating the air in said chamber to obtain a substantially uniform distribution of heat within the chamber, a U-shaped pipe positioned within said chamber extending substantially the length thereof, means for supplying fresh air to said pipe at one end, the other end of said pipe being connected to one end of said tube, and means for removing air from the opposite end of said tube and for passing said air through said heating means to incinerate the volatized enamel solvents therein.

9. In a wire enameling apparatus, an oven having a chamber formed therein, an inclined tube extending through said chamber, means for passing a strand through said tube, means for covering the lower end of said tube with a quantity of liquid to form an air seal, means for heating the air in said chamber, means for circulating the air in said chamber to obtain a substantially uniform distribution of heat within the chamber, means for supplying heated fresh air to the lower end of said tube, and means for removing air from the upper end of said tube and passing said air through said heating means to incinerate the volatilized enamel solvents therein.

10. In a wire enameling apparatus, a tube, means for passing a coated wire through said tube, a heating chamber for said tube, means forming an open-ended channel in said chamber surrounding said tube, a blower having its outlet connected to one end of said channel and its inlet to the opposite end, means in communication with the blower and channel for heating the air circulated by the blower, and means for operating said blower to circulate the air through said channel at such a rate as to maintain said tube at a substantially constant temperature.

11. In a strand coating apparatus, a tube, means for passing a coated strand through said tube, a heating chamber having heating means therein for heating said tube, means forming an open-ended channel in said chamber surrounding said tube, a blower having its outlet connected to one end of said channel and its inlet to the opposite end of said channel, means for operating said blower to circulate air through said channel at such a rate as to maintain said tube at a substantially constant temperature, and means for supplying a limited amount of preheated gaseous material to the interior of said tube to oxidize said coating.

HENRY M. LARSEN.

REFERENCES CITED

The following references are of record in the file of this patent:

UNITED STATES PATENTS

| Number | Name | Date |
| --- | --- | --- |
| 1,841,485 | Larsen | Jan. 19, 1932 |
| 2,034,270 | Reading | Mar. 17, 1936 |
| 2,328,078 | Kugler | Aug. 31, 1943 |
| Re. 20,712 | Harris | May 3, 1938 |
| 2,289,862 | Bailey | July 14, 1942 |
| 767,900 | Lee | Aug. 16, 1904 |
| 1,947,478 | Martindell | Feb. 20, 1934 |
| 1,924,554 | Houby | Aug. 29, 1933 |
| 2,103,134 | Akahira | Dec. 21, 1937 |
| 806,270 | Lubbertsmeier | Dec. 5, 1905 |
| 2,269,150 | Flynn | Jan. 6, 1942 |
| 2,380,422 | Frank | July 31, 1945 |
| 1,972,924 | Dreyfus | Sept. 11, 1934 |
| 2,234,730 | Haskell | Mar. 11, 1941 |

FOREIGN PATENTS

| Number | Country | Date |
| --- | --- | --- |
| 422,345 | Germany | Nov. 28, 1925 |